United States Patent
Davis et al.

(10) Patent No.: US 11,610,497 B2
(45) Date of Patent: Mar. 21, 2023

(54) SYSTEM AND METHOD TO DISPLAY SVS TAXI MODE EXOCENTRIC VIEW OF AIRCRAFT

(71) Applicant: Rockwell Collins, Inc., Cedar Rapids, IA (US)

(72) Inventors: Jason Davis, Marengo, IA (US); Marcin Kolesinski, Central City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 240 days.

(21) Appl. No.: 17/122,806

(22) Filed: Dec. 15, 2020

(65) Prior Publication Data
US 2022/0189327 A1 Jun. 16, 2022

(51) Int. Cl.
| | |
|---|---|
| *G08G 5/06* | (2006.01) |
| *G06K 9/62* | (2022.01) |
| *G08G 5/00* | (2006.01) |
| *G06V 20/58* | (2022.01) |
| *B60R 1/27* | (2022.01) |

(52) U.S. Cl.
CPC .............. *G08G 5/065* (2013.01); *B60R 1/27* (2022.01); *G06K 9/6215* (2013.01); *G06V 20/58* (2022.01); *G08G 5/0047* (2013.01); *B60R 2300/207* (2013.01)

(58) Field of Classification Search
CPC ........ G08G 5/065; G08G 5/0047; B60R 1/27; B60R 2300/207; G06K 9/6215; G06V 20/58
See application file for complete search history.

(56) References Cited

U.S. PATENT DOCUMENTS

| | | |
|---|---|---|
| 6,784,869 B1 | 8/2004 | Clark et al. |
| 6,995,746 B2 | 2/2006 | Aymeric |
| 7,212,890 B2 | 5/2007 | Lafon et al. |
| 7,286,062 B2 | 10/2007 | Feyereisen et al. |
| 7,375,678 B2 | 5/2008 | Feyereisen et al. |
| 7,499,794 B1 | 3/2009 | Bailey et al. |
| 7,743,337 B1* | 6/2010 | Maeda ............... G01C 21/3682 340/995.27 |
| 7,965,223 B1 | 6/2011 | McCusker |
| 7,974,773 B1 | 7/2011 | Krenz et al. |

(Continued)

FOREIGN PATENT DOCUMENTS

| | | |
|---|---|---|
| AU | 7815800 A1 | 4/2001 |
| CN | 110826788 A | 2/2020 |

(Continued)

*Primary Examiner* — Dale W Hilgendorf
(74) *Attorney, Agent, or Firm* — Suiter Swantz pc llo (57) ABSTRACT

A system may include a display and a processor communicatively coupled to the display. The processor may be configured to: generate a synthetic vision system (SVS) taxi mode exocentric view of an aircraft when the aircraft is performing taxi operations and when the aircraft is on ground, wherein the SVS taxi mode exocentric view includes at least one range ring centered around a depiction of the aircraft, each of the at least one range ring providing a visual indication of a given range between the aircraft and a given range ring; and output, to the display, the SVS taxi mode exocentric view. The display may be configured to: display the SVS taxi mode exocentric view.

14 Claims, 5 Drawing Sheets

(56) References Cited

U.S. PATENT DOCUMENTS

| | | |
|---|---|---|
| 8,159,416 B1 | 4/2012 | Yum et al. |
| 8,193,948 B1 | 6/2012 | Shapiro et al. |
| 8,234,066 B2 | 7/2012 | Wipplinger et al. |
| 8,306,745 B1 | 11/2012 | Clark et al. |
| 8,433,459 B2 | 4/2013 | Michel et al. |
| 8,560,214 B1 | 10/2013 | Krenz et al. |
| 8,698,654 B2 * | 4/2014 | He .................. G08G 5/065 701/16 |
| 8,786,467 B2 | 7/2014 | Clark et al. |
| 9,000,952 B1 | 4/2015 | VanDerKamp et al. |
| 9,046,369 B2 | 6/2015 | Chytil et al. |
| 9,174,744 B2 | 11/2015 | Depape et al. |
| 9,189,964 B1 | 11/2015 | Rathinam et al. |
| 9,222,800 B1 | 12/2015 | Scherer et al. |
| 9,347,794 B1 | 5/2016 | Tiana et al. |
| 9,389,082 B2 | 7/2016 | Dhulipudi et al. |
| 9,487,304 B1 | 11/2016 | Bowen et al. |
| 9,517,844 B2 | 12/2016 | Khatwa et al. |
| 9,527,601 B2 | 12/2016 | Wyatt et al. |
| 9,561,865 B2 | 2/2017 | Marczi et al. |
| 9,718,558 B2 | 8/2017 | Ball et al. |
| 9,779,630 B2 | 10/2017 | Auletto et al. |
| 9,786,467 B2 | 10/2017 | Iijima |
| 9,799,225 B2 | 10/2017 | Lueck et al. |
| 10,001,376 B1 * | 6/2018 | Tiana .................. G01C 23/005 |
| 10,140,876 B2 | 11/2018 | Khatwa et al. |
| 10,168,876 B2 | 1/2019 | Kaprani et al. |
| 10,234,303 B1 | 3/2019 | Chandrashekarappa et al. |
| 10,789,854 B1 | 9/2020 | Kolesinski |
| 2008/0186207 A1 * | 8/2008 | Fetzmann ............. G01C 21/00 340/972 |
| 2010/0194601 A1 | 8/2010 | Servantie et al. |
| 2010/0250030 A1 | 9/2010 | Nichols et al. |
| 2010/0283636 A1 | 11/2010 | Clark et al. |
| 2011/0130963 A1 * | 6/2011 | Feyereisen ............ G08G 5/065 345/595 |
| 2012/0194556 A1 | 8/2012 | Schmitt et al. |
| 2013/0057414 A1 * | 3/2013 | Nutaro .................. G08G 5/065 340/958 |
| 2013/0166189 A1 * | 6/2013 | Michel .................. G08G 5/065 701/120 |
| 2013/0231853 A1 | 9/2013 | Feyereisen et al. |
| 2014/0303815 A1 | 10/2014 | Lafon et al. |
| 2015/0045994 A1 * | 2/2015 | Krishna .................. B64C 25/44 701/3 |
| 2016/0152348 A1 | 6/2016 | Mohideen et al. |
| 2016/0343262 A1 | 11/2016 | Auletto et al. |
| 2017/0083206 A1 | 3/2017 | He et al. |
| 2018/0181299 A1 | 6/2018 | Ouellette et al. |
| 2019/0004318 A1 | 1/2019 | Descheemaeker et al. |
| 2019/0043164 A1 | 2/2019 | He |
| 2019/0066523 A1 | 2/2019 | Pesik et al. |
| 2019/0228668 A1 | 7/2019 | Wang et al. |
| 2020/0152071 A1 | 5/2020 | Schwindt |
| 2021/0304623 A1 * | 9/2021 | Davis .................. G08G 5/0039 |
| 2022/0005364 A1 * | 1/2022 | Wang .................. G08G 5/0078 |

FOREIGN PATENT DOCUMENTS

| | | |
|---|---|---|
| EP | 0880827 A1 | 12/1998 |
| EP | 2000778 B1 | 11/2010 |
| EP | 2610590 B1 | 10/2015 |
| EP | 3446984 A1 | 2/2019 |
| EP | 3476743 A1 | 5/2019 |
| GB | 1592780 A | 7/1981 |
| JP | 1990204787 A | 8/1990 |
| JP | 1994168001 A | 6/1994 |
| WO | 1998052174 A1 | 11/1998 |
| WO | 2007146520 A2 | 12/2007 |

\* cited by examiner

SYSTEM AND METHOD TO DISPLAY SVS TAXI MODE EXOCENTRIC VIEW OF AIRCRAFT

BACKGROUND

While taxiing, the perspective of a synthetic vision system (SVS) image may be behind the aircraft, and such perspective can impact the crew's ability to gauge distance between the aircraft and obstacles, taxiways, or runways.

While taxiing with an exocentric view, the viewing angle of a virtual camera is shifted behind the aircraft, which changes the crew's perception of distances in a synthetic scene, and this can change their judgment of the aircraft position with respect to airport features. Further, without the ability to cross-reference aircraft position in the synthetic scene with the view out the window, as would be the case in low-visibility taxi operations, the potential for crews to miss turns along taxi routes exists.

SUMMARY

In one aspect, embodiments of the inventive concepts disclosed herein are directed to a system. The system may include a display and a processor communicatively coupled to the display. The processor may be configured to: generate a synthetic vision system (SVS) taxi mode exocentric view of an aircraft when the aircraft is performing taxi operations and when the aircraft is on ground, wherein the SVS taxi mode exocentric view includes at least one range ring centered around a depiction of the aircraft, each of the at least one range ring providing a visual indication of a given range between the aircraft and a given range ring; and output, to the display, the SVS taxi mode exocentric view. The display may be configured to: display the SVS taxi mode exocentric view.

In a further aspect, embodiments of the inventive concepts disclosed herein are directed to a method. The method may include: generating, by a processor communicatively coupled to a display, a synthetic vision system (SVS) taxi mode exocentric view of an aircraft when the aircraft is performing taxi operations and when the aircraft is on ground, wherein the SVS taxi mode exocentric view includes at least one range ring centered around a depiction of the aircraft, each of the at least one range ring providing a visual indication of a given range between the aircraft and a given range ring; outputting, by the processor to the display, the SVS taxi mode exocentric view; and displaying, by the display, the SVS taxi mode exocentric view.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method configured to generate and display a synthetic vision system (SVS) taxi mode exocentric view of an aircraft when the aircraft is performing taxi operations and when the aircraft is on ground, wherein the SVS taxi mode exocentric view includes at least one range ring centered around a depiction of the aircraft, each of the at least one range ring providing a visual indication of a given range between the aircraft and a given range ring.

Figure 1:
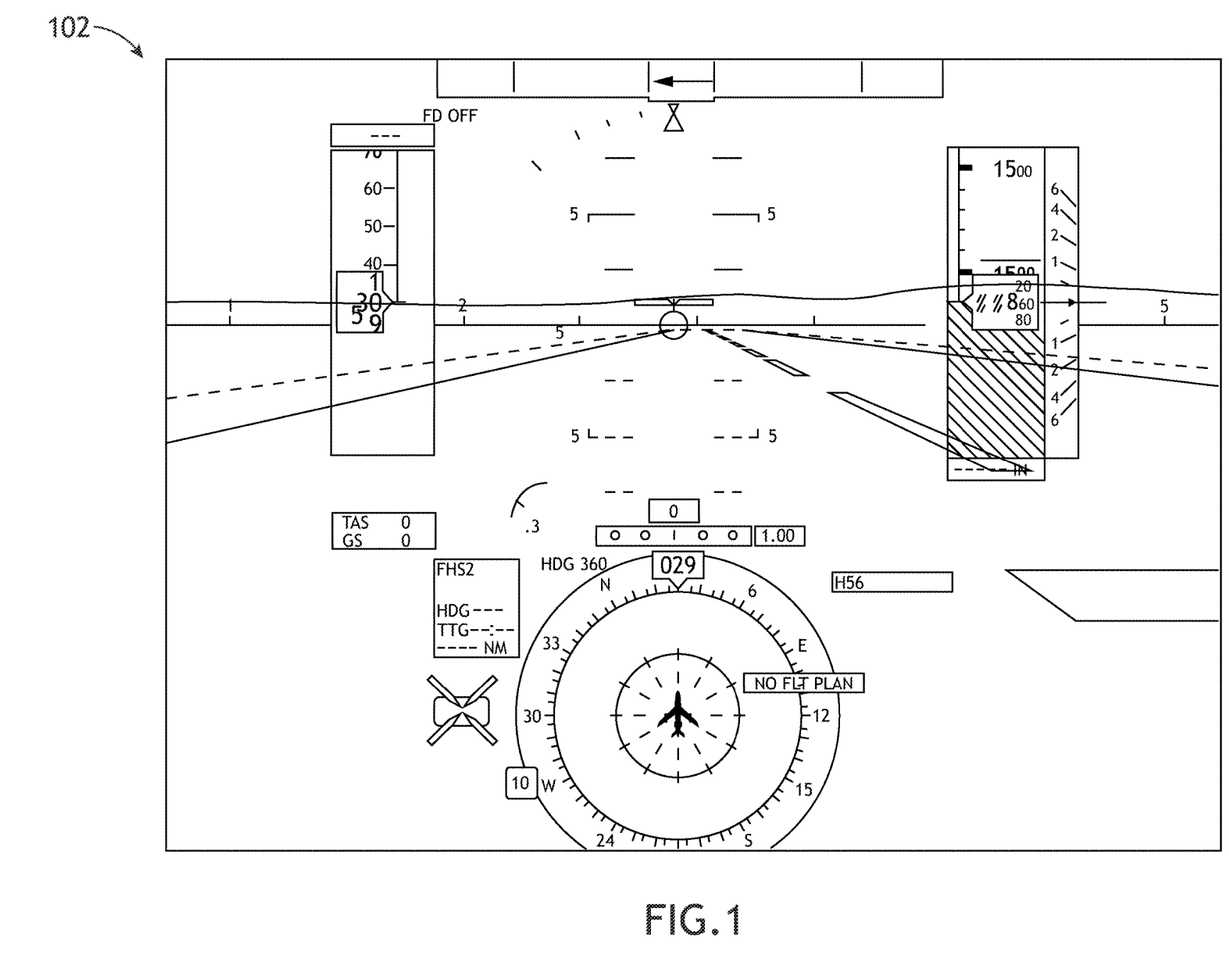
FIG. 1 is a view of an exemplary embodiment of an SVS flight mode egocentric view according to the inventive concepts disclosed herein.

Referring now to FIG. 1, an exemplary embodiment of an SVS flight mode egocentric view 102 according to the inventive concepts disclosed herein is depicted. The SVS flight mode egocentric view 102 may be used as a background for a primary flight display (PFD) (e.g., 306 or 402) providing an egocentric view of the area in front of the aircraft (e.g., 300). The SVS flight mode egocentric view 102 may provide a relatively narrow (e.g., as compared to an SVS taxi mode exocentric view 202) field of view, which may be sufficient for take-off, flight, and landing operations. The SVS flight mode egocentric view 102 may include primary flight display symbology overlaid on the SVS flight mode egocentric view 102.

Figure 2:
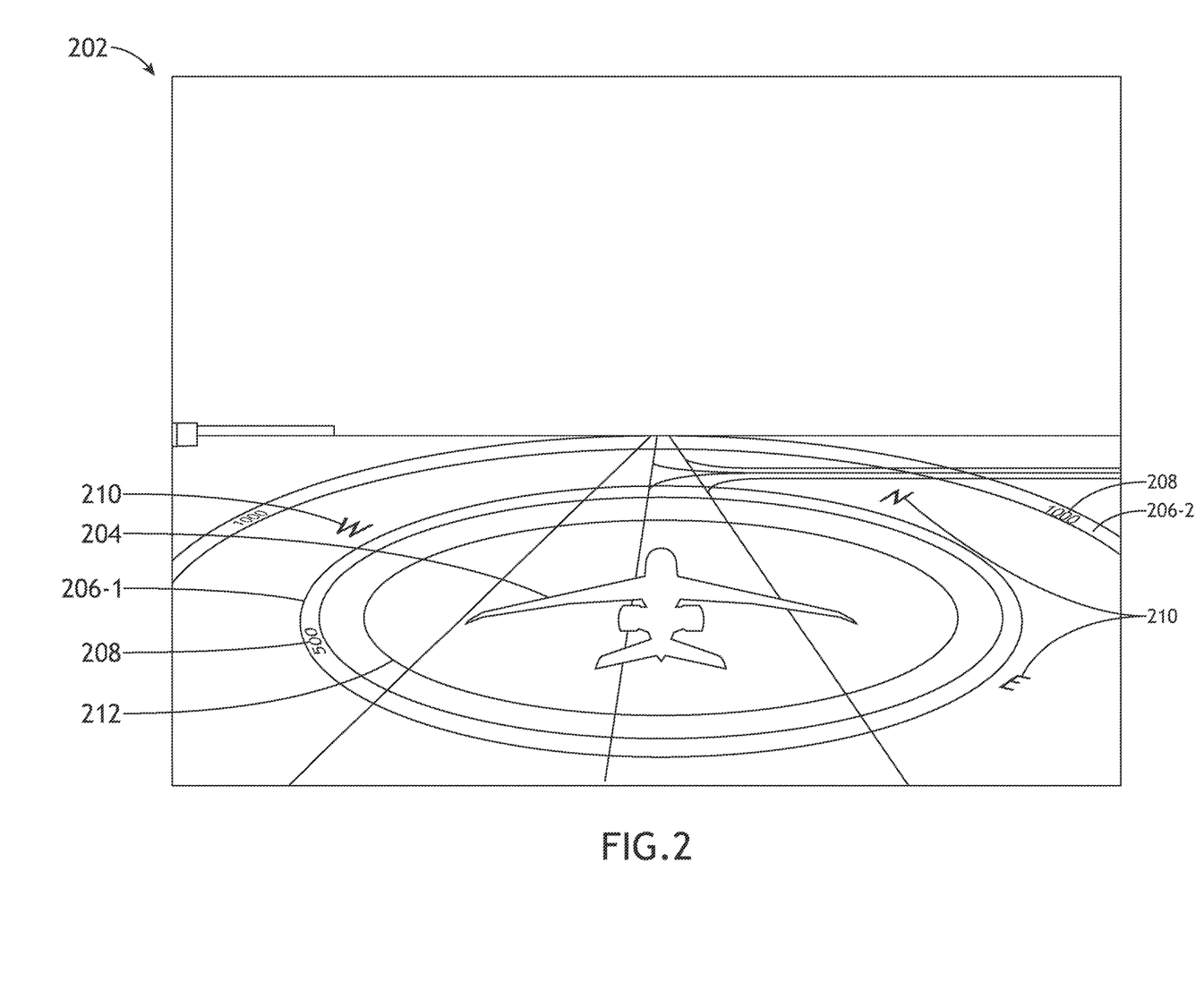
FIG. 2 is a view of an exemplary embodiment of an SVS taxi mode exocentric view according to the inventive concepts disclosed herein.

Referring now to FIG. 2, an exemplary embodiment of an SVS taxi mode exocentric view 202 according to the inventive concepts disclosed herein is depicted. The SVS taxi mode exocentric view 202 may provide a wider field of view than the SVS flight mode egocentric view 102 for use during taxi operations. The SVS taxi mode exocentric view 202 may improve support for taxi operations. The SVS taxi mode exocentric view 202 may provide an exocentric view of an area surrounding the aircraft (e.g., 300). The eye-point of the synthetic imagery for the SVS taxi mode exocentric view 202 may be above and behind the aircraft. The SVS taxi mode exocentric view 202 may expand the field of view of the synthetic scenery. The location of the aircraft (e.g., 300) within this scene may be represented by an aircraft depiction 204 (e.g., an aircraft outline). For example, the aircraft outline may be projected onto the ground in the synthetic scene with the aircraft within the outline shown as transparent, solid, or translucent.

The SVS taxi mode exocentric view 202 may declutter much of the PFD symbology to emphasize the synthetic view of the world around the aircraft (e.g., 300) such that the SVS taxi mode exocentric view 202 may have less of the PFD symbology overlaid on the SVS taxi mode exocentric view 202 than the SVS flight mode egocentric view 102. Because of the decluttering of PFD symbology, the SVS taxi mode exocentric view 202 should only be used for taxi operations. The PFD should return to the SVS flight mode egocentric view 102 before or as the aircraft (e.g., 300) begins a take-off run. The PFD may have logic to determine when automatic transitions between flight mode and taxi mode may occur. This ensures the PFD is returned to a proper configuration prior to take-off.

As shown in FIG. 2, the SVS taxi mode exocentric view 202 may include an aircraft depiction 204, at least one range ring (e.g., range rings, 206-1, 206-2), compass features 210, and/or a dynamic error circle 212, any or all of which may be enabled or disabled by a user and/or the system at any given time.

For example, the range rings, 206-1, 206-2 may be centered around a depiction 204 of the aircraft 300. Each range ring 206-1, 206-2 may provide a visual indication of a given range between the aircraft 300 and a given range ring. Each range ring 206-1, 206-2 may include a given numerical range indicator 208 indicative of a given range between the given range ring and the aircraft 300. Each range ring 206-1, 206-2 may be statically or dynamically sized with respect to the given range. For example, the range rings (e.g., 206-1, 206-2) originate at the aircraft position with a range of zero (not shown) and may extend outward with uniform or non-uniform spacing. The range rings 206-1, 206-2 in the synthetic scene may be colored differently (e.g., lightened) as compared against ground and surface features to make the range more easily and readily identifiable to the crew. Within each range ring 206-1, 206-2, the distance from the aircraft may be displayed as a numerical range indicator 208 to eliminate the need to remember what distances are provided. Presentation of the range rings 206-1, 206-2 allows the crew to "feel" how much farther the aircraft 300 needs to travel to reach a next taxi route instruction or distance from obstacles and may be used concurrently with existing airport moving map (AMM) functionality to determine relative position. Such range rings 206-1, 206-2 may be provided in the synthetic scene by the SVS application and may require no additional user interface beyond what already exists in a cockpit to enable and disable the SVS imagery.

The compass features 210 may be positioned around or within one of the range rings 206-1, 206-2. The compass features 210 may indicate compass directions (e.g., North (N), South (S), East (E), and/or West (W); a heading; and/or degrees).

The dynamic error circle 212 may be positioned around a point of the depiction 204 of the aircraft 300. A size of the dynamic error circle 212 may change dynamically based on positioning accuracy (e.g., global positioning system (GPS) accuracy). For example, the dynamic error circle 212 may be a dynamic horizontal figure of merit (HFOM) error circle positioned around a point of the depiction 204 of the aircraft 300, and a size of the dynamic HFOM error circle may change dynamically based on global positioning system (GPS) accuracy. In some embodiments, the dynamic error circle 212 and the range rings 206-1, 206-2 may be depicted differently with respect to at least one of: a circle thickness, a dashed or solid circle, a color, a transparency, or a texture. For example, the dynamic error circle 212 can be dynamically sized and/or modulated based upon a coupled dynamic sensor accuracy metric. For example, if GPS is used to depict the aircraft position relative to airport surfaces from a database, this metric can include, for example, the HFOM (horizontal figure of merit) computed by a GPS receiver, and may incorporate other sources of image generation inaccuracies, such as database accuracy, antenna placement uncertainties, and/or etc.

In some embodiments, the SVS taxi mode exocentric view 202 may further include a three-dimensional (3D) depiction of the ground and surface features, and the range rings 206-1, 206-2 may be projected onto the three-dimensional depiction of the ground and surface features. For example, the three-dimensional depiction of the ground and surface features may be based at least on at least one of: a database of airport features (e.g., an ARINC 816 database), heading sensor(s) (e.g., GPS, inertial reference unit (IRU), and/or magnetometer), or sensor data. For example, the sensor data may be obtained from at least one of a camera, a light detection and ranging (LIDAR) sensor, or a millimeter (mm) wave array. For example, given information from the database of airport features and/or sensor data, an SVS taxi mode exocentric view 202 include 3D depiction can be generated of the environment surrounding the aircraft 300, by using a 3D perspective projection. The features of the surrounding environment can then be depicted relative to an aircraft depiction 204 in an exocentric perspective, wherein the scale/distance from ownship to various recognizable features (e.g., a hangar, taxiway, runway, etc.) may be preserved in relationship to other features (noting that the aircraft depiction 204 itself may not necessarily be drawn to scale). In such an SVS taxi mode exocentric view 202, range rings 206-1, 206-2 can be drawn about the aircraft depiction 204, while preserving the same perspective projection as surrounding airport features. For example, by projecting the range rings 206-1, 206-2 down towards the ground (and potentially minimizing the rings' size, making the range rings 206-1, 206-2 translucent, adding a callout of range ring's distance, and/or etc.) the range rings 206-1, 206-2 may serve as an easy reference for the pilot to approximate the distance to anything of interest in the 3D projected scene of the SVS taxi mode exocentric view 202. In this type of rendering, the range rings 206-1, 206-2 may stay fixed relative to the aircraft depiction 204, and the surrounding surfaces may move relative to the range rings 206-1, 206-2 and the aircraft depiction 204, as the aircraft 300 traverses the airport.

Figure 3:
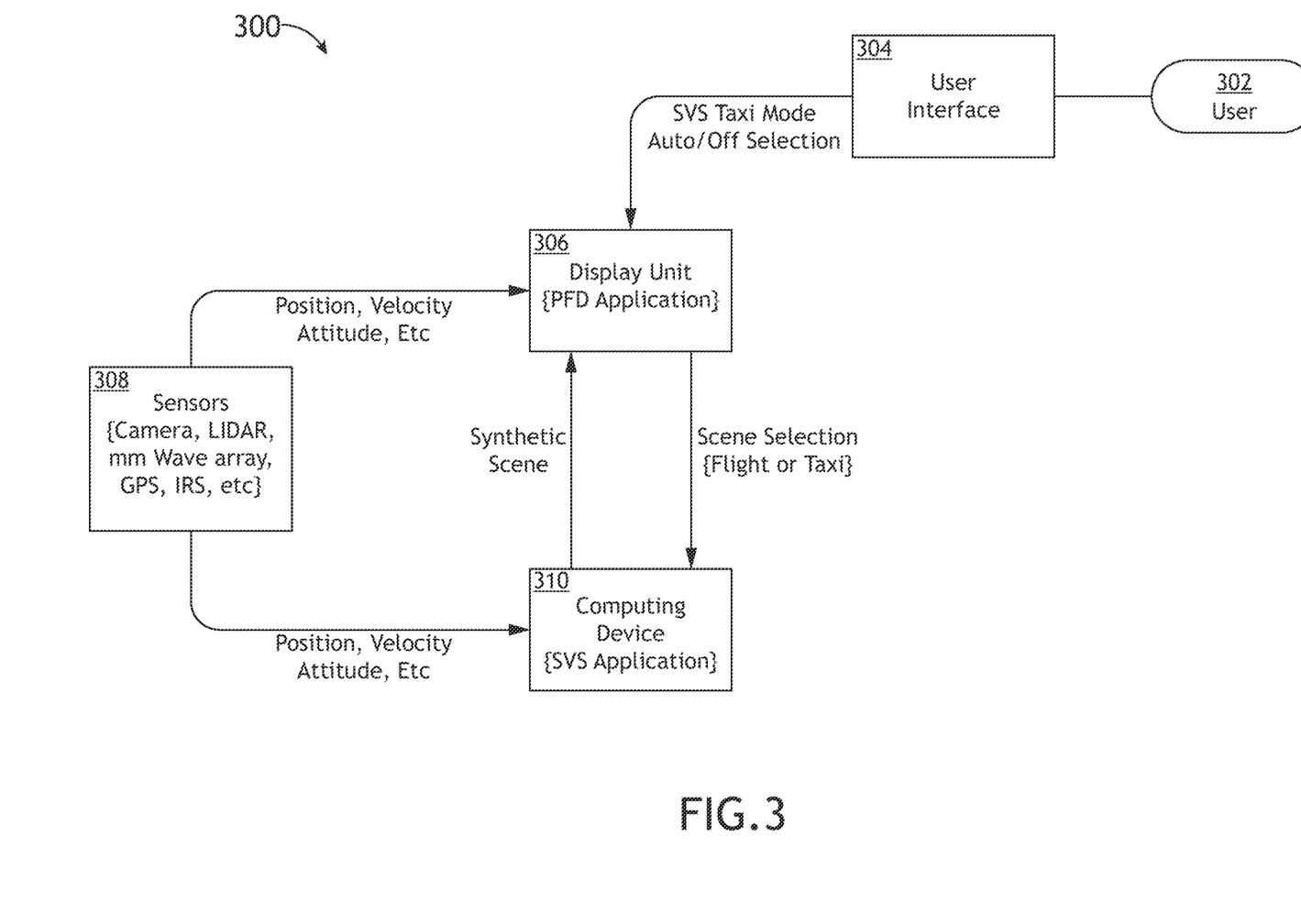
FIG. 3 is a view of an exemplary embodiment of a system according to the inventive concepts disclosed herein.
Figure 4:
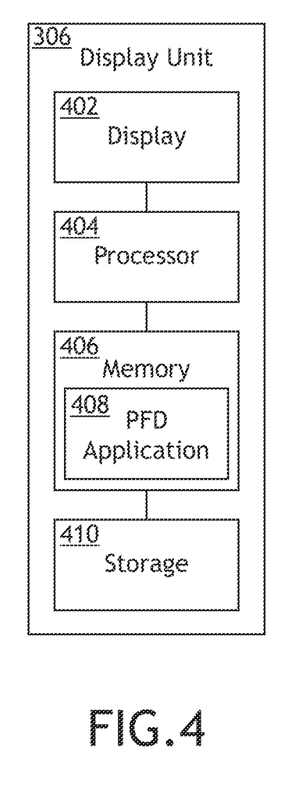
FIG. 4 is a view of an exemplary embodiment of a display unit computing device of the system of FIG. 3 according to the inventive concepts disclosed herein.
Figure 5:
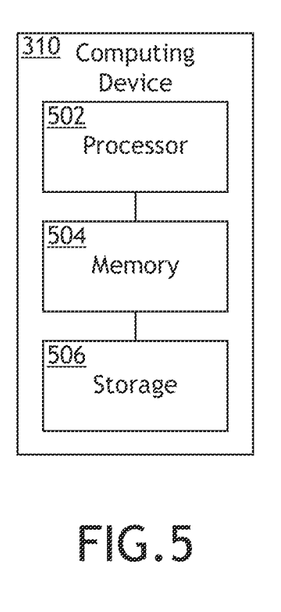
FIG. 5 is a view of an exemplary embodiment of a computing device of the system of FIG. 3 according to the inventive concepts disclosed herein.

Referring now to FIG. 3-5, an exemplary embodiment of a system according to the inventive concepts disclosed herein is depicted. In some embodiments, the system may include the aircraft 300, which may include at least one user 302, at least one user interface 304, at least one display unit computing device 306, sensors 308, and/or at least one computing device 310, some or all of which may be communicatively coupled at any given time. In some embodiments, the at least one display unit computing device 306 and/or the at least one computing device 310 may be implemented as a single computing device or any number of computing devices configured to perform any or all of the operations disclosed throughout.

The user 302 may be a pilot or crew member. The user 302 may be configured to interface with the system via the at least one user interface 304, for example, to select SVS taxi mode to be Auto or Off, to disable, adjust, or enable any or all of the visual features (e.g., range rings 206-1, 206-2, compass features 210, and/or a dynamic error circle 212) of the SVS taxi mode exocentric view 202 (shown in FIG. 2), to perform crew operations, perform aircraft operations, complete an electronic checklist(s), and/or complete an electronic checklist item(s). The at least one user interface 304 may be implemented as any suitable user interface, such as a touchscreen (e.g., of the display unit computing device 306 and/or another display unit), a multipurpose control panel, a cursor control panel, a keyboard, a mouse, a trackpad, a button, a switch, an eye tracking system, and/or a voice recognition system. The user interface 304 may be configured to receive a user selection and to output the user selection to a computing device (e.g., the display unit computing device 306). For example, a pilot of the aircraft 300 may be able to disable, adjust, or enable any or all of the visual features (e.g., range rings 206-1, 206-2, compass features 210, and/or a dynamic error circle 212) of the SVS taxi mode exocentric view 202.

The display unit computing device 306 may be implemented as any suitable computing device, such as a PFD computing device. As shown in FIG. 4, the display unit computing device 306 may include at least one display 402, at least one processor 404, at least one memory 406, and/or storage 410, some or all of which may be communicatively coupled at any given time. For example, the at least one processor 404 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 404 may include a CPU and a GPU configured to perform (e.g., collectively perform) any of the operations disclosed throughout. The processor 404 may be configured to run various software applications (e.g., a PFD application 408) or computer code stored (e.g., maintained) in a non-transitory computer-readable medium (e.g., memory 406 and/or storage 410) and configured to execute various instructions or operations. The processor 404 may be configured to perform any or all of the operations disclosed throughout. For example, the processor 404 may be configured to: output, to the at least one display 402, an SVS taxi mode exocentric view 202 of an aircraft 300 when the aircraft 300 is performing taxi operations and when the aircraft 300 is on ground. The display 402 may be configured to: display the SVS taxi mode exocentric view 202 when the aircraft is performing taxi operations and when the aircraft is on ground.

The sensors 308 may be any suitable sensors, such as at least one global positioning system (GPS) sensor, heading sensor(s) (e.g., GPS, inertial reference unit (IRU), and/or magnetometer), at least one of a camera, a light detection and ranging (LIDAR) sensor, or a millimeter (mm) wave array, and/or any other sensors commonly installed in aircraft. The sensors 308 may be configured to output sensor data (e.g., image, position, velocity, and/or attitude) to some or all of the computing devices (e.g., 306 and/or 310).

The at least one computing device 310 may be implemented as any suitable computing device, such as an SVS computing device. As shown in FIG. 5, the computing device 310 may include at least one processor 502, at least one memory 504, and/or storage 506, some or all of which may be communicatively coupled at any given time. For example, the at least one processor 502 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform) any of the operations disclosed throughout. For example, the at least one processor 502 may include a CPU and a GPU configured to perform (e.g., collectively perform) any of the operations disclosed throughout. The processor 502 may be configured to run various software applications (e.g., an SVS application) or computer code stored (e.g., maintained) in a non-transitory computer-readable medium (e.g., memory 504 and/or storage 506) and configured to execute various instructions or operations. The processor 502 of the computing device 310 may be configured to perform any or all of the operations disclosed throughout. For example, the processor 502 of the computing device 310 may be configured to: generate a synthetic vision system (SVS) taxi mode exocentric view 202 of an aircraft 300 when the aircraft 300 is performing taxi operations and when the aircraft is on ground, wherein the SVS taxi mode exocentric view 202 includes at least one range ring 206-1, 206-2 centered around a depiction 204 of the aircraft 300, each of the at least one range ring 206-1, 206-2 providing a visual indication of a given range between the aircraft 300 and a given range ring 206-1, 206-2; and/or output, to the at least one display 402, an SVS taxi mode exocentric view 202.

For example, at least one processor (e.g., the at least one processor 404 and/or the at least one processor 502 of the at least one computing device 310) may be configured to: generate a synthetic vision system (SVS) taxi mode exocentric view 202 of an aircraft 300 when the aircraft 300 is performing taxi operations and when the aircraft is on ground, wherein the SVS taxi mode exocentric view 202 includes at least one range ring 206-1, 206-2 centered around a depiction 204 of the aircraft 300, each of the at least one range ring 206-1, 206-2 providing a visual indication of a given range between the aircraft 300 and a given range ring 206-1, 206-2; and/or output, to the at least one display 402, an SVS taxi mode exocentric view 202.

At least one processor (e.g., the at least one processor 404 and/or the at least one processor 502) of the aircraft 300 may be configured to perform (e.g., collectively perform) any or all of the operations disclosed throughout.

Figure 6:
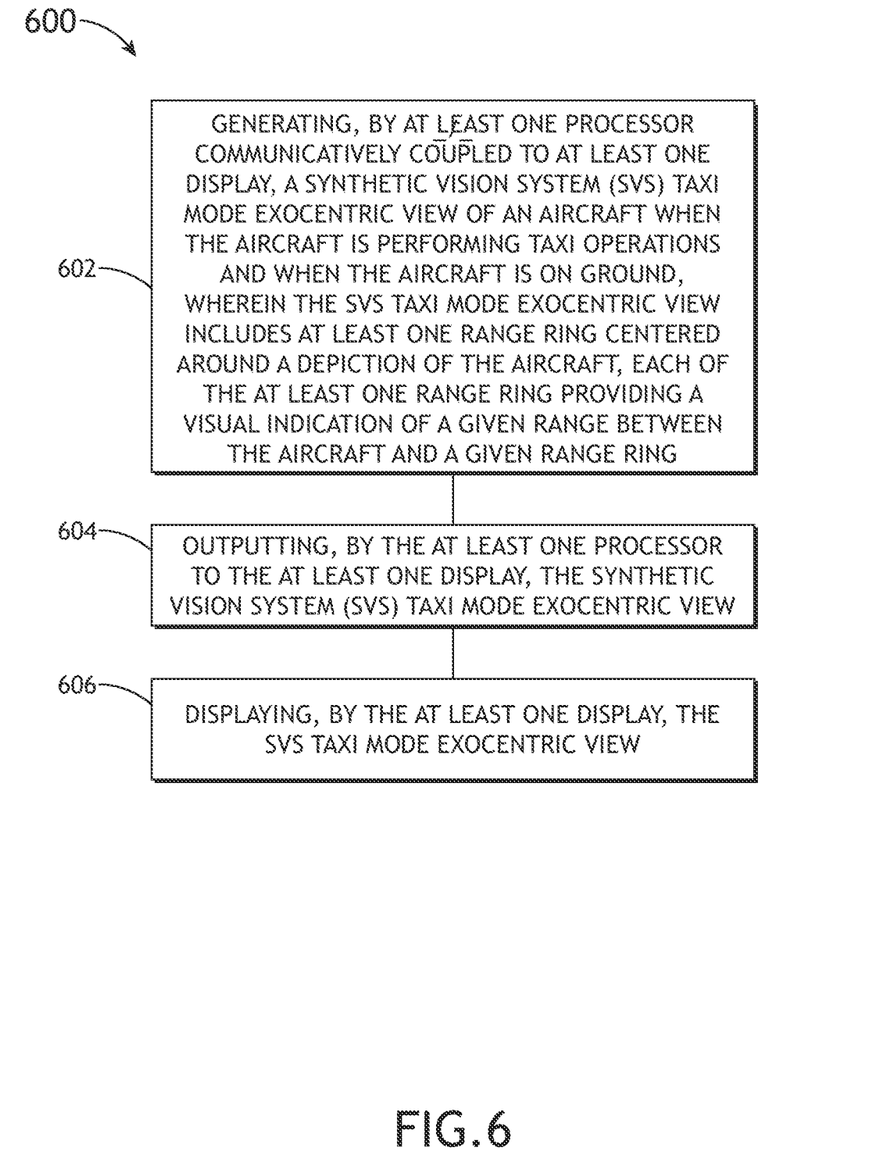
FIG. 6 is a diagram of an exemplary embodiment of a method according to the inventive concepts disclosed herein.

Referring now to FIG. 6, an exemplary embodiment of a method 600 according to the inventive concepts disclosed herein may include one or more of the following steps. Additionally, for example, some embodiments may include performing one or more instances of the method 600 iteratively, concurrently, and/or sequentially. Additionally, for example, at least some of the steps of the method 600 may be performed in parallel and/or concurrently. Additionally, in some embodiments, at least some of the steps of the method 600 may be performed non-sequentially.

A step 602 may include generating, by at least one processor communicatively coupled to at least one display, a synthetic vision system (SVS) taxi mode exocentric view of an aircraft when the aircraft is performing taxi operations and when the aircraft is on ground, wherein the SVS taxi mode exocentric view includes at least one range ring centered around a depiction of the aircraft, each of the at least one range ring providing a visual indication of a given range between the aircraft and a given range ring.

A step 604 may include outputting, by the at least one processor to the at least one display, the SVS taxi mode exocentric view.

A step 606 may include displaying, by the at least one display, the SVS taxi mode exocentric view.

Further, the method 600 may include any of the operations disclosed throughout.

As will be appreciated from the above, embodiments of the inventive concepts disclosed herein may be directed to a system and a method configured to generate and display a synthetic vision system (SVS) taxi mode exocentric view of an aircraft when the aircraft is performing taxi operations and when the aircraft is on ground, wherein the SVS taxi mode exocentric view includes at least one range ring centered around a depiction of the aircraft, each of the at least one range ring providing a visual indication of a given range between the aircraft and a given range ring.

As used throughout and as would be appreciated by those skilled in the art, "at least one non-transitory computer-readable medium" may refer to as at least one non-transitory computer-readable medium (e.g., memory 406, memory 504, storage 410, and/or storage 506; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
at least one display; and
at least one processor communicatively coupled to the display, the at least one processor configured to:
generate a synthetic vision system (SVS) taxi mode exocentric view of an aircraft when the aircraft is performing taxi operations and when the aircraft is on ground, wherein the SVS taxi mode exocentric view includes at least one range ring centered around a depiction of the aircraft, each of the at least one range ring providing a visual indication of a given range between the aircraft and a given range ring; and output, to the at least one display, the SVS taxi mode exocentric view;

wherein the at least one display is configured to: display the SVS taxi mode exocentric view;

wherein the SVS taxi mode exocentric view further includes a dynamic error circle positioned around a point of the depiction of the aircraft, wherein a size of the dynamic error circle changes dynamically based on positioning accuracy.

2. The system of claim 1, wherein each of the at least one range ring includes a given numerical range indicator indicative of the given range.

3. The system of claim 1, wherein the at least one range ring is at least two range rings.

4. The system of claim 1, wherein the SVS taxi mode exocentric view further includes compass features positioned around or within one of the at least one range ring, the compass features indicating compass directions.

5. The system of claim 1, wherein the dynamic error circle is a dynamic horizontal figure of merit (HFOM) error circle positioned around a point of the depiction of the aircraft, wherein a size of the dynamic HFOM error circle changes dynamically based on global positioning system (GPS) accuracy.

6. The system of claim 5, wherein the dynamic HFOM error circle and the at least one range ring are depicted differently with respect to at least one of: a circle thickness, a dashed or solid circle, a color, a transparency, or a texture.

7. The system of claim 1, wherein the SVS taxi mode exocentric view further includes a three-dimensional depiction of the ground and surface features, wherein the at least one range ring is projected onto the three-dimensional depiction of the ground and surface features.

8. The system of claim 7, wherein the three-dimensional depiction of the ground and surface features is based at least on a database of airport features and sensor data.

9. The system of claim 7, wherein the three-dimensional depiction of the ground and surface features is based at least on a database of airport features.

10. The system of claim 7, wherein the three-dimensional depiction of the ground and surface features is based at least on sensor data.

11. The system of claim 10, wherein the sensor data is obtained from at least one of a camera, a light detection and ranging (LIDAR) sensor, or a millimeter (mm) wave array.

12. The system of claim 1, wherein each of the at least one range ring is statically sized with respect to the given range.

13. The system of claim 1, wherein each of the at least one range ring includes a given numerical range indicator indicative of the given range, wherein the at least one range ring is at least two range rings, wherein the SVS taxi mode exocentric view further includes compass features positioned around or within one of the at least one range ring, the compass features indicating compass directions, wherein the dynamic error circle is a dynamic horizontal figure of merit (HFOM) error circle positioned around the point of the depiction of the aircraft, wherein a size of the dynamic HFOM error circle changes dynamically based on global positioning system (GPS) accuracy, wherein the dynamic HFOM error circle and the at least one range ring are depicted differently with respect to at least one of: a circle thickness, a dashed or solid circle, a color, a transparency, or a texture, wherein the SVS taxi mode exocentric view further includes a three-dimensional depiction of the ground and surface features, wherein the at least one range ring is projected onto the three-dimensional depiction of the ground and surface features, wherein the three-dimensional depiction of the ground and surface features is based at least on at least one of a database of airport features or sensor data.

14. A method, comprising:
generating, by at least one processor communicatively coupled to at least one display, a synthetic vision system (SVS) taxi mode exocentric view of an aircraft when the aircraft is performing taxi operations and when the aircraft is on ground, wherein the SVS taxi mode exocentric view includes at least one range ring centered around a depiction of the aircraft, each of the at least one range ring providing a visual indication of a given range between the aircraft and a given range ring;

outputting, by the at least one processor to the at least one display, the SVS taxi mode exocentric view; and displaying, by the at least one display, the SVS taxi mode exocentric view;

wherein the SVS taxi mode exocentric view further includes a dynamic error circle positioned around a point of the depiction of the aircraft, wherein a size of the dynamic error circle changes dynamically based on positioning accuracy.

\* \* \* \* \*